United States Patent [19]

Chiba et al.

[11] Patent Number: 4,899,636

[45] Date of Patent: Feb. 13, 1990

[54] INSTRUMENT FOR TUNING MUSICAL INSTRUMENTS

[75] Inventors: Mitsuharu Chiba; Kazuyoshi Taniguchi; Hiroshi Iwase, all of Tokyo, Japan

[73] Assignee: Seiko Instruments Inc., Tokyo, Japan

[21] Appl. No.: 298,557

[22] Filed: Jan. 17, 1989

[30] Foreign Application Priority Data

Feb. 3, 1988 [JP] Japan ............................ 63-13461[U]
Sep. 30, 1988 [JP] Japan ............................ 63-246568

[51] Int. Cl.⁴ ............................................ G01G 7/02

[52] U.S. Cl. ...................................... 84/454; 381/88; 381/114; 84/DIG. 18; 84/DIG. 24

[58] Field of Search ................................ 84/454–458, 84/DIG. 18, DIG. 24; 381/111-115, 91, 88

[56] References Cited

U.S. PATENT DOCUMENTS 4,163,408 8/1979 Capano et al. ....................... 84/454
4,569,077 2/1986 Marinelli et al. ............ 84/DIG. 24

FOREIGN PATENT DOCUMENTS 2389957 1/1979 France ................................ 84/454

*Primary Examiner*—L. T. Hix
*Assistant Examiner*—David M. Gray
*Attorney, Agent, or Firm*—Bruce L. Adams; Van C. Wilks

[57] ABSTRACT

A tuning apparatus comprises a piezoelectric element provided on a tuner case, and a mounting member which enable the tuning apparatus to be mounted on a musical instrument to be tuned. The piezoelectric element converts vibration provided by the musical instrument through the tuner case into an electric signal, and outputs the electric signal to a pitch calculation circuit. The tuning apparatus prevents the detection error due to a harmonic component having a larger amplitude than that of fundamental wave component by making the resonance frequency of the tuner case lower than the frequency of the lowest note of the musical instrument to be tuned.

7 Claims, 6 Drawing Sheets

INSTRUMENT FOR TUNING MUSICAL INSTRUMENTS

BACKGROUND OF THE INVENTION

1. Field of the Invention

This invention relates to a tuning apparatus to be used for tuning musical instruments, particularly to a tuning apparatus which has a mounting member so as to be mounted on the musical instruments to be tuned.

2. Description of the Prior Art

As a tuning apparatus of the prior art Japanese Patent Laid-Open No. 164092/1987 to Seiko Instruments Inc., relates to a tuning apparatus which has a microphone for detecting a sound of a musical instruments to be tuned, as shown in FIG. 13. The sound produced by the musical instruments is inputted into a pickup, e.g., microphone, and converted into an electrical signal. The electrical signal is filtered by a filter 24 which has a band-pass width for passing each octave frequency. The signal provided by the filter 24 is processed by a pitch calculation circuit 3 through a waveform shaping circuit 2. The pitch calculation circuit 3 calculates an octave, a note and pitch deviation of the signal on the basis of a reference signal outputted from a reference signal generation circuit 4. The calculated results are displayed by a display 6 composed of an LED, liquid crystal display or the like. However, the conventional tuning apparatus picks up noise around the instrument to be tuned when the sound of the instrument is inputted to the microphone, and tuning is very difficult. In the case of inputting an electric signal outputted from a musical instrument to be tuned into the tuning apparatus through a cord coupling the musical instrument with the tuning apparatus, the cord is impedimental for a player and a noise induced on the cord makes tuning difficult.

In order to solve the above problems, another tuning apparatus having a built-in electromagnetic pickup such as that shown in FIG. 14 is also known. Although the above described problem is solved because the input signal is neither a sound nor an electric signal but an electromagnetic signal, the instruments being tuned are restricted to instruments using metal chords. In addition, an electromagnetic pickup 26 must be situated right above a chord 27 so as to sense the magnetic field and, as a result, tuning must be conducted while holding a tuning device 25 with one hand, thereby making tuning very troublesome.

Furthermore, in some musical instruments, a harmonic component such as a double wave and a triple wave produces a larger sound than a fundamental wave component. It is well known that when an amplitude of a double wave or a triple wave is larger than that of the fundamental wave, they are apt to be mistaken for the notes one octave higher and five degrees higher, respectively. To prevent this, it is necessary to insert the filter 2 as shown in FIG. 13, which makes the amplitude of the fundamental wave component larger than that of the harmonic component. However, since the tuning apparatus must have a plurality of filters for each octave, the scale of the circuit is enlarged. It is therefore impossible to obtain a small and inexpensive tuning appratus which is capable of exact detection of an octave.

SUMMARY OF THE INVENTION

An object and advantage of the present invention is to provide a tuning apparatus which is able to accurately tune a musical instrument without fear of picking up the noise around the musical instrument.

Another object of the present invention is to provide a tuning apparatus in which a piezoelectric element is incorporated thereinto and picks up vibration from the musical instrument through a tuner case, in use, the tuning apparatus is mounted on the musical instrument, thereby eliminating an impedimental cord used for inputting a signal from the musical instrument and noise induced on the cord.

Still another object of the present invention is to provide a tuning apparatus which is able to tune a musical instrument without being restricted to an instrument using metal chords.

A more specific object of the present invention is to provide a tuning apparatus which has no electrical filter for discrimination of the octave information.

A still other object of the present invention is to provide a tuning apparatus without enlarging the scale of the circuit and increasing the cost.

The above and other related objects and features of the invention will be apparent from a reading of the following description of the disclosure found in the accompanying drawings and novelty thereof pointed out in the appended claims.

DESCRIPTION OF THE PREFERRED EMBODIMENT

Figure 1:
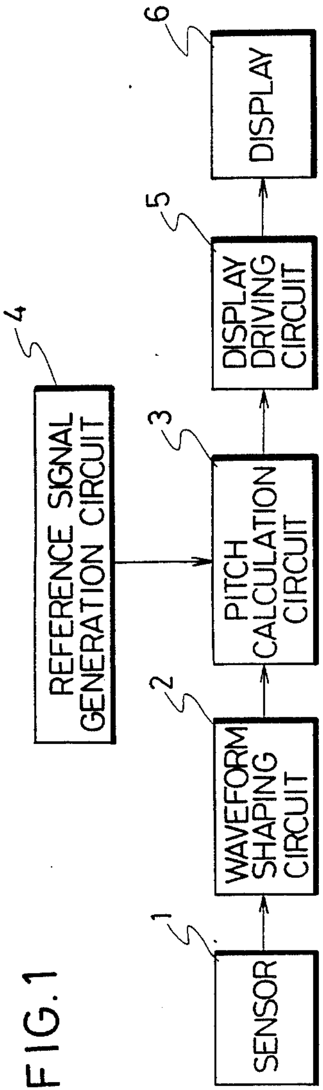
FIG. 1 is a block diagram of a tuning apparatus according to the present invention.
Figure 4:
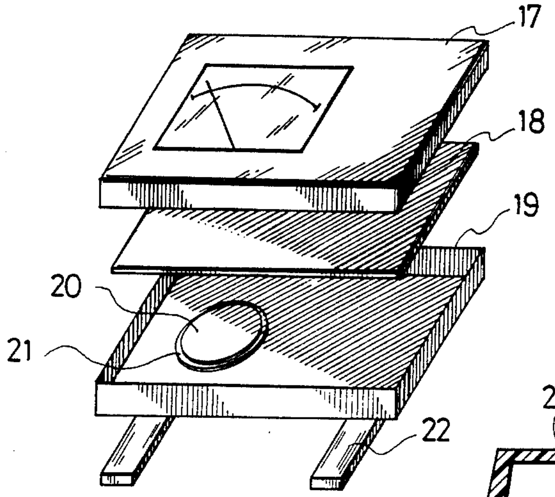
FIG. 4 schematically shows the assembly of the tuning apparatus of the present invention.
Figure 13:
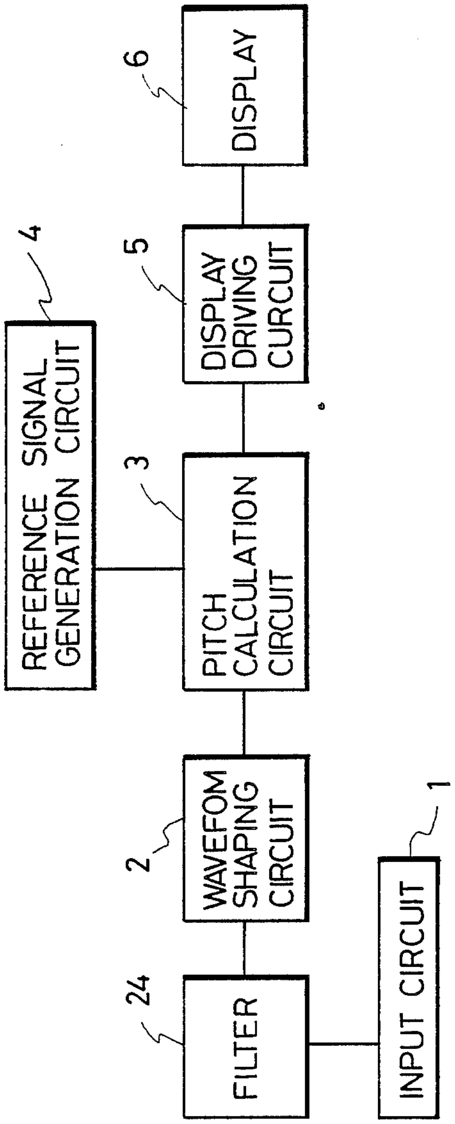
FIG. 13 PRIOR ART
FIG. 13 is a block diagram of a tuning apparatus according to the prior art.
Figure 14:
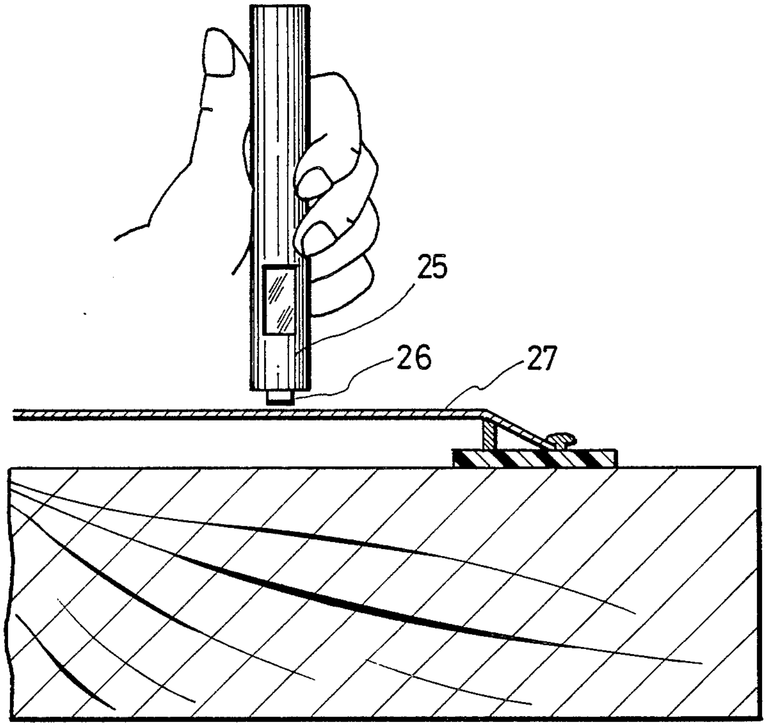
FIG. 14 PRIOR ART
FIG. 14 shows a tuning apparatus having an electromagnetic pickup according to the prior art.

An embodiment of the present invention will be explained with reference to the accompanying drawings. FIG. 1 is a block diagram of a tuning device according to the present invention. The tuning device is placed on a musical instrument or mounted on the instrument by means of a suction member or the like. When the musical instrument is tuned by a player, a vibration produced by the instrument body is transmitted to a sensor 1, e.g. piezoelectric element 20, mounted on a tuner case as shown in FIG. 4. The tuner case has a specific resonance frequency. Due to the resonance frequency characteristic of the tuner case, the frequency component of the vibration which is higher than the fundamental wave component is removed. That is, the tuner case has the same function as the filter 24 shown in FIG. 13 which is necessary for detecting an octave in the prior art. The vibration which is close to the fundamental wave component alone is transmitted to the sensor 1, e.g. piezoelectric element 20, mounted on the case of the tuning apparatus, and an electric signal which corresponds to the vibration is output from the piezoelectric element 20. A wave shaping circuit 2 converts the electric signal output from the piezoelectric element into a signal which can be processed by a pitch calculation circuit 3. The pitch calculation circuit 3 is comprised of a custom IC or a microprocessor, and detects a deviation of the sound to be tuned from a reference tone and the pitch name and the octave of the sound on the basis of the reference signal output from a reference signal generation circuit 4 and outputs the data to a display 6 through a display driving circuit 5. The display 6 is comprised of a meter, LED or liquid crystal panel and displays the data.

Figure 2:
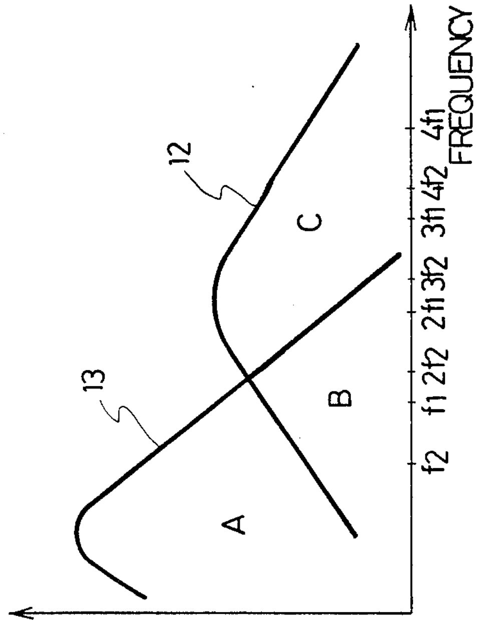
FIG. 2 shows the frequency characteristics of the tuner case of the present invention and a sound provided by an instrument.

FIG. 2 shows the resonance frequency characteristic 13 of the tuner case of the present invention and the frequency characteristic 12 of the instrument to be tuned. It is known that every instrument has its own frequency characteristic, which is the main factor in making the tone intrinsic to the instrument. For example, in FIG. 2, the frequency characteristic of a musical instrument which will be described later is shown. It shows that with respect to the sound having a frequency of the fundamental wave component f2, the triple wave component 3f2 is strongest, and with respect to the sound having a frequency of the fundamental wave component f1, the double wave component 2f1 is strongest. When the vibration of the instrument having such a frequency characteristic is received by the tuning apparatus having the frequency characteristic 13, the frequency characteristic 13 of the tuner case functions similarly to a low-pass filter, and the vibration is passed or amplified in the region A, attenuated in the region B and cut in the region C. In order to positively discriminate the octave by the tuning apparatus, it is necessary that the peak of the frequency characteristic of the tuner case be lower than the lowest note of the instrument being tuned. The resonance frequency of the tuner case is mainly determined by the size, thickness, shape and material of the case. It has been made clear both experimentally and theoretically, for example, that the increase in the size or the thickness of the case decreases the resonance frequency, so that it is possible to make a tuning apparatus for a specific instrument by adjusting the resonance frequency of the tuning apparatus to the frequency characteristic of the instrument being detected such as a guitar and a piano.

Figure 3A:
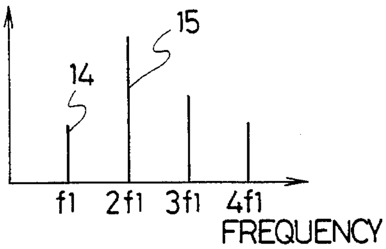
FIG. 3 shows the spectrum of a sound provided by an instrument and the spectrum of the output of the piezoelectric element mounted on the tuning apparatus inputted the sound to be tuned.
Figure 3B:
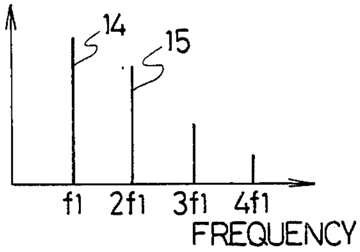
Figure 3C:
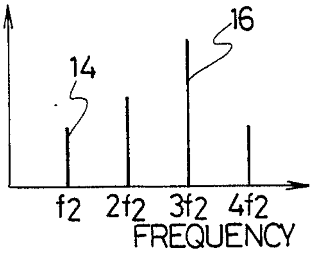
Figure 3D:
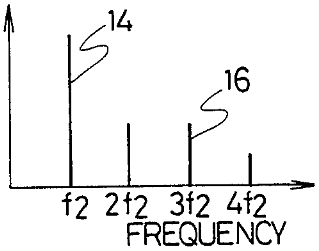

FIGS. 3A, 3B, 3C and 3D show the spectra of the vibration of the instrument to be tuned and the spectra of the vibration output as electric signals from the piezoelectric element 20 through the tuner case. FIG. 3A shows the spectra of the vibration of the sound f1 of the instrument having the frequency characteristic 12 shown in FIG. 2. It is shown that since the fundamental wave 14 is smaller than the double wave 15, when the sound is tuned by the spectrum component as it is, there is a possibility of being mistaken for the sound of the double wave 15 one octave higher. FIG. 3B shows the spectra of signals output as electric signals from the piezoelectric element 20 provided the vibration of the instrument through the tuner case has the frequency characteristic 13 shown in FIG. 2. Due to the tuner case, the output signal assumes the same state as the state of having passed through a filter having the frequency characteristic 13. That is, the fundamental wave 14 is passed or amplified, while the double wave 15 is attenuated or cut, thereby enabling the correct discrimination of the octave. FIG. 3C shows the spectra of the vibration of the sound of f2 of the instrument having the frequency characteristic 12. It is shown that since the fundamental waver 14 is smaller than the triple wave 16, when the sound is tuned by the spectrum component as it is, there is a possibility of being mistaken for the sound of C five degrees higher when the fundamental wave 14 is C, for example. By using the tuning apparatus of the present invention, since the fundamental wave 14 is amplified, the double wave is attenuated and the triple wave 16 is almost cut, it is possible to correctly discriminate the pitch name.

FIG. 4 shows the assembly of the tuning apparatus of the present invention. Between a plastic front caes 17 and a plastic rear case 19, a substrate 18 with electronic parts provided thereon is held by a holding member not shown. The plastic front case 17 has a display unit such as a liquid crystal display, LED display or a meter. A mounting member 22 having a shock absorbing effect such as a rubber foot and a sucker is provided on the rear case 19 to contact with the instrument to be tuned. The mounting member 22 serves to prevent the noise which would be produced when the tuner case is directly in contact with the instrument and to prevent the vibration mode of the tuning apparatus and instrument from being changed. The piezoelectric element 20 pasted to a metal vibrating plate 21 is bonded to the inside of the rear case 19.

Figure 5:
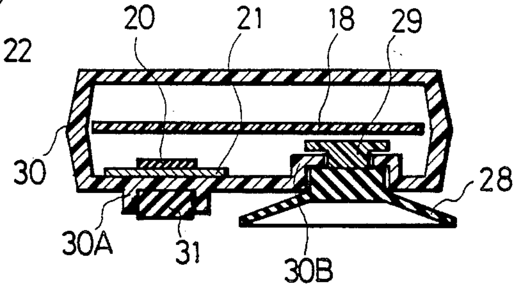
FIG. 5 is a sectional view of a tuning apparatus according to the present invention.

FIG. 5 shows a sectional view of another embodiment of the tuning apparatus according to the present invention. The substrate 18 with electronic parts thereon is held in a plastic case 30 by a holding member not shown. A vibration inputting member 31 made of rubber is mounted on a recess 30A of the case 30 for picking up the vibration provided by the musical instrument to be tuned. The piezoelectric element 20 pasted to the metal vibrating plate 21 is bounded to the inside of the case 30 corresponding to the vibration inputting member 31. A sucker 28 for mounting the tuning apparatus on the musical instrument is mounted with a cock 29 on a surface portion 3B of the case 30.

Figure 6:
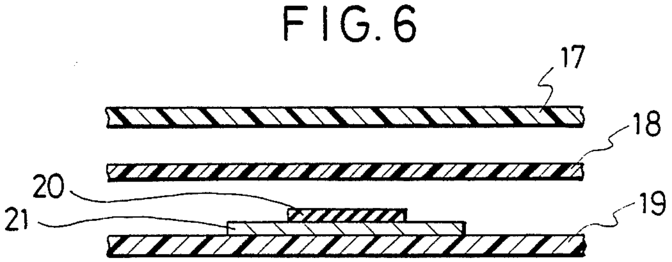
FIGS. 6, 7, 8 and 9 are sectional views of the piezoelectric element mounted on the tuning apparatus according to the present invention.
Figure 7:
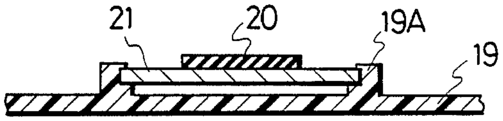
Figure 8:
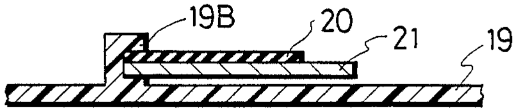
Figure 9:
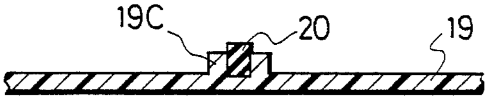

FIGS. 6, 7, 8 and 9 show sectional views of the piezoelectric element mounted on the tuning apparatus. Lead wires (not shown) are connected to the waveform shaping circuit 2 and the ground. In FIG. 6, the reference numeral 17 represents a front case and 18 a substrate with electric parts provided thereon. To a plastic rear case 19, a metal vibrating plate 21 with a piezoelectric element 20 pasted thereto is adhered by an adhesive tape or the like. In FIG. 7, a projection 19A for receiving a piezoelectric element 20 is provided on the rear case 19 in such a manner as to secure the periphery of the metal vibrating plate 21. In FIG. 8, a projection 19B having a concave portion is provided on the rear case 19 in such a manner as to secure one side of the vibrating plate 21. In FIG. 9, a projection 19C is provided on the rear case 19 in such a manner as to secure a rectangular parallelopiped piezoelectric element 20 in the state of being embedded in the projection 19C. The resonance frequency of the piezoelectric element itself can be changed by changing the metal vibrating plate 21 pasted on the piezoelectric element 20.

Figure 10:
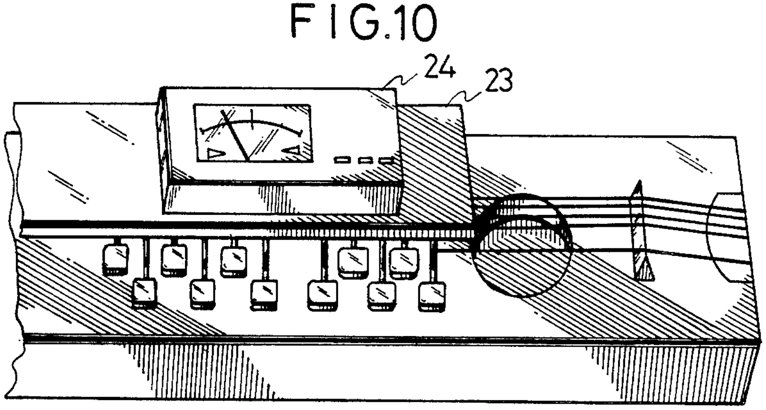
FIG. 10 is a perspective view of the tuning apparatus used for a Taisho lyre.

FIG. 10 is a perspective view of the tuning apparatus of the present invention used for a Taisho lyre. Since a Taisho lyre is an instrument in which the same pitch notes are tuned in different octaves, the function of discriminating the octave is very useful to a beginner. When a tuning apparatus 24 of the present invention is placed on the surface place 23 of the lyre, the vibration of the picked chord is received by the tuning apparatus 24, which displays an octave information and a pitch deviation.

The resonance frequency of the tuning apparatus may be adjusted in accordance with the instrument being tuned in the form of a synthesized frequency characteristic by fixing the same material as the case, a metal plate or the like to the tuner case.

Figure 11:
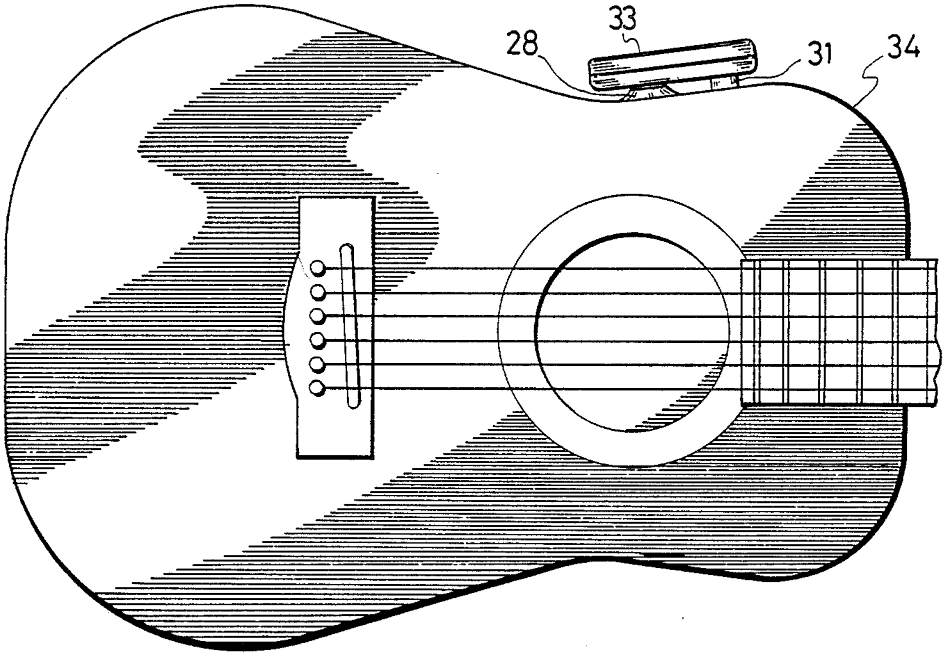
FIG. 11 shows a tuning apparatus according to the present invention mounted on an acoustic guitar.

FIG. 11 shows a tuning apparatus 33 according to the present invention mounted on an acoustic guitar. In FIG. 11, the tuning apparatus 33 is mounted on the side plate of an acoustic guitar 34 by a sucker 28, but it may also be mounted on the surface plate or the back plate. When a chord is picked by player, the vibration of the picked chord is received by the piezoelectric element mounted on the inner surface of the tuning apparatus through a vibration inputting member 31.

Figure 12:
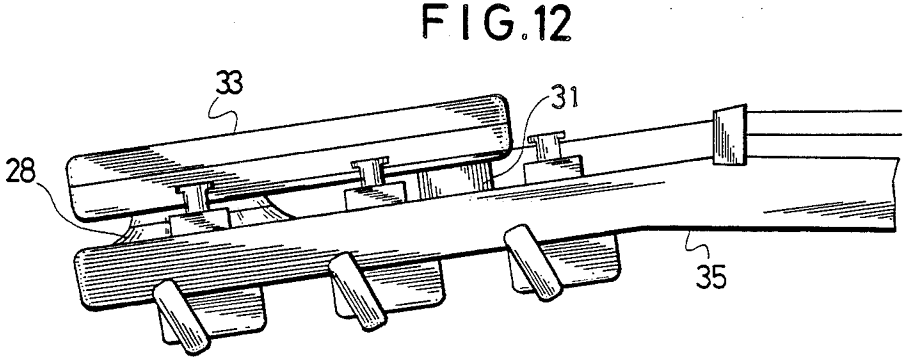
FIG. 12 shows a tuning apparatus according to the present invention mounted on the head of the acoustic guitar shown in FIG. 11.

FIG. 12 shows the tuning apparatus 33 according to the present invention mounted on the head of the acoustic guitar 35 shown in FIG. 11. The reference numeral 35 represents a head, which is a part of the acoustic guitar 35.

As explained above, according to the present invention, by mounting the tuning apparatus having a piezoelectric element on the inner surface of the tuning apparatus, the tuning apparatus has an effect of improving the tuning efficiency without being influenced by the noise around the instrument. In addition, since the resonance frequency of the tuner case is adjusted to the frequency being lower than the lowest note of the musical instrument to be tuned, no filter is used which is necessary for discrimination of the octave in the prior art, and it is possible to correctly discriminate the octave and the pitch name without enlarging the scale of the circuit and increasing the cost.

Furthermore, there is no need to take a trouble of bringing the tuning apparatus close to the chord of the instrument with one hand in tuning unlike a conventional tuning device having a build-in electromagnetic pickup, thereby enabling the operability to be improved.

What is claimed is:

1. A tuning apparatus for tuning a musical instrument, comprising:
   - housing means having a resonance frequency lower than a frequency of the lowest note of the musical instrument to be tuned;
   - mounting means provided on an outer surface of said housing means for mounting the tuning apparatus on the musical instrument;
   - converting means provided on an inner surface of said housing means for converting a vibration produced by the musical instrument through said mounting means and said housing means into an electrical signal;
   - signal generating means for generating at least a signal having a reference frequency;
   - calculating means coupled with said converting means and said signal generating means in said housing means for calculating a pitch of the output signal from said converting means and a pitch deviation between the pitch of said output signal and the pitch of said reference frequency of the signal from said signal generating means; and
   - display means for displaying information calculated by said calculating means and being disposed on the outer surface of said housing means.

2. A tuning apparatus for tuning a musical instrument, comprising:
   - housing means having a resonance frequency lower than a frequency of the lowest note of the musical instrument to be tuned;
   - mounting means provided on an outer surface of said housing means for mounting the tuning apparatus on the musical instrument;
   - inputting means provided on the same outer surface on which is provided said mounting means for inputting a vibration produced by the musical instrument into said housing means;
   - converting means provided on an inner surface of said housing means for converting a vibration produced by said housing means into an electrical signal;
   - signal generating means for generating at least a signal having a reference frequency;
   - calculating means coupled with said converting means and said signal generating means in said housing means for calculating a pitch of the output signal from said converting means and a pitch deviation between the pitch of said output signal and the pitch of said reference frequency of the signal from said signal generating means; and
   - display means for displaying information calculated by said calculating means and being disposed on the outer surface of said housing means.

3. The tuning apparatus described in claim 1 or 2, wherein said converting means comprises a piezoelectric member.

4. The tuning apparatus described in claim 1 or 2, wherein said mounting means removably mounts said tuning apparatus on said musical instrument.

5. The tuning apparatus described in claim 4, wherein said mounting means has a suction means for adhering by suction to a surface of said musical instrument when the suction means is pressed against the surface of said musical instrument.

6. The tuning apparatus described in claim 5, wherein said suction means comprises at least one sucker.

7. A tuning apparatus for tuning a musical instrument, comprising:
   - housing means haing a resonance frequency lower than a frequency of the lowest note of the musical instrument to be tuned;
   - inputting means provided on an outer surface of said housing means for inputting a vibration produced by the musical instrument into said housing means when the tuning apparatus is placed on the surface of the musical instrument;
   - converting means provided on an inner surface of said housing means for converting a vibration produced by said housing means into an electrical signal;

signal generating means for generating at least a signal having a reference frequency;

calculating means coupled with said converting means and said signal generating means in said housing means for calculating a pitch of the output signal from said converting means and a pitch deviation between the pitch of said output signal and the pitch of the reference frequency of the signal from said signal generating means; and display means for displaying information calculated by said calculating means and being disposed on the outer surface of said housing means.

* * * * *